(12) United States Patent
Sakakibara et al.

(10) Patent No.: US 6,862,259 B2
(45) Date of Patent: Mar. 1, 2005

(54) OPTICAL LENS, OPTICAL PICKUP APPARATUS, AND OPTICAL DISK APPARATUS USING THE SAME

(75) Inventors: Hiroyuki Sakakibara, Tokyo (JP); Hiroyuki Ueda, Kanagawa (JP)

(73) Assignee: Sony Corporation (JP)

( * ) Notice: Subject to any disclaimer, the term of this patent is extended or adjusted under 35 U.S.C. 154(b) by 615 days.

(21) Appl. No.: 09/962,307

(22) Filed: Sep. 26, 2001

(65) Prior Publication Data

US 2002/0036974 A1 Mar. 28, 2002

(30) Foreign Application Priority Data

Sep. 26, 2000 (JP) .................................... P2000-292145

(51) Int. Cl.$^7$ ............................................... G11B 7/00
(52) U.S. Cl. ................................................. 369/112.23
(58) Field of Search ....................... 369/112.23, 112.25, 369/112.26, 112.08, 112.13, 112.2; 359/642, 708, 719

(56) References Cited

U.S. PATENT DOCUMENTS

| | | | | |
|---|---|---|---|---|
| 4,925,283 A | * | 5/1990 | Morishita et al. | 359/708 |
| 5,805,355 A | * | 9/1998 | Natsuno | 359/719 |
| 6,181,673 B1 | * | 1/2001 | Wilde et al. | 369/300 |
| 6,650,469 B2 | * | 11/2003 | Kim et al. | 359/363 |

* cited by examiner

Primary Examiner—Thang V. Tran
(74) Attorney, Agent, or Firm—Ronald P. Kananen; Rader, Fishman & Grauer PLLC

(57) ABSTRACT

Providing an objective lens capable of achieving reliable centering during formation, allowing high-precision formation, and improving durability of a manufacturing apparatus, and providing an optical pickup apparatus and an optical disk apparatus using that objective lens. According to the present invention, an objective lens is formed so as to satisfy condition $0.3 \leq Z/D \leq 0.5$, where Z is a sag amount equivalent to a length of a convexly curved optical surface along an optical axis, and D is an optically effective diameter equivalent to a length which is optically effective for the optical surface and is orthogonal to the optical axis. It is possible to reliably perform centering during fabrication of the objective lens and allow high-precision formation for decreasing the lens aberration.

5 Claims, 8 Drawing Sheets

OPTICAL LENS, OPTICAL PICKUP APPARATUS, AND OPTICAL DISK APPARATUS USING THE SAME

BACKGROUND OF THE INVENTION

1. Field of the Invention

The present invention relates to an objective lens, an optical pickup apparatus, and an optical disk apparatus using the same. More specifically the present invention concerns an objective lens for focusing light beams on optical disks such as a magneto-optical disk (MO), a compact disk (CD), CD-ROM, etc. and an optical pickup apparatus and an optical disk apparatus using the same.

2. Description of the Related Art

An optical disk apparatus is widely known as an apparatus for recording information on an optical disk or reproducing information recorded in an optical disk. Generally, the optical disk apparatus comprises an optical disk drive apparatus for rotating an optical disk and an optical pickup apparatus. The optical pickup apparatus focuses on an optical disk a light beam irradiated from a light source via an objective lens controlled and driven in two axial directions, namely focusing and tracking directions, and receives return light from the optical disk.

FIG. 8 shows an example of the optical pickup apparatus. In this example, an optical pickup apparatus 1 mainly comprises a beam splitter 5, an optical detector 6, a grating element 8, and a semiconductor laser 9. The beam splitter 5 is positioned below the objective lens 3 inserted below an optical disk 2 and is slanted 45° against an optical axis 4. The optical detector 6 is arranged below the beam splitter 5. The grating element 8 and the semiconductor laser 9 are serially arranged to the side of a reflecting surface 7 of the beam splitter 5.

FIG. 9 shows an example of a drive section for driving the objective lens in two axial directions. In this example, an objective lens drive section 10 comprises a horizontally extending elastic suspension 11, an objective lens holder 12, a focusing coil 13, a tracking coil 14, the objective lens 3, a magnetic yoke 15, and a magnet 16 fixed to the yoke 15. The suspension 11 supports the objective lens holder 12, the focusing coil 13, and the tracking coil 14. The objective lens 3 is horizontally held in the objective lens holder 12.

In this configuration, the optical disk drive apparatus (not shown) rotates the optical disk 2. The objective lens drive section 10 inserts the objective lens 3 into an optical path. The light beam 17 is horizontally irradiated from the semiconductor laser 9. The grating element 8 divides the irradiated light beam into a main beam and a sub-beam. These beams are reflected upward on the reflecting surface 7 of the beam splitter 5. The reflected light beam 17 is refracted in the objective lens 3 and is focused on a signal recording surface 18 of the optical disk 2. The light beam is then reflected downward and becomes the return light beam 17. The return light beam 17 is again refracted in the objective lens 3, passes the beam splitter 5, and then enters the optical detector 6.

The optical detector 6 performs a photoelectric conversion. Based on an output detection signal, the apparatus reproduces information recorded on the signal recording surface 18 of the optical disk 2. At this time, a focusing error signal and a tracking error signal are detected. Based on these signals, a drive current for the focusing coil 13 and the tracking coil 14 is servo-controlled. A current passing through the focusing coil 13 and the tracking coil 14 interacts with a magnetic field generated by the yoke 15 and the magnet 16. Accordingly, the objective lens 3 is controlled to be driven in the focusing and tracking directions.

FIG. 10 shows the objective lens 3. The objective lens 3 comprises a convexly curved optical surface 19, another convexly curved optical surface 21, and a flange-shaped rim section 23 formed between these optical surfaces 19 and 21. A curvature radius of the optical surface 19 is relatively large. There is a length from the top of the optical surface 19 to the rim section 23 along the optical axis 4. This length is hereafter referred to as a "sag amount" and is assumed to be Z. There is a length which is optically effective for the optical surface 19 and is orthogonal to the optical axis 4. This length is hereafter referred to as an "optically effective diameter" and is assumed to be D. Under this condition, a value of Z/D generally ranges from 0.15 to 0.3.

Generally, the objective lens 3 is fabricated by using a pressing machine 24 as shown in FIG. 11. The pressing machine 24 comprises an upper mold 25 and a lower mold 26. The upper mold 25 can be lifted and lowered and is provided opposite the lower mold 26. An upper die plate 28 of the upper mold 25 is fixed to the bottom face of an upper heat insulating coupler 27. An upper die 30 made of sintered hard alloy includes an upper cavity 29 and is fixed to the bottom face of the upper die plate 28. In the upper cavity 29, there is formed a concavely curved concave section 31 which matches the shape of another optical surface 21. Like the upper mold 25, the lower mold 26 comprises a lower heat insulating coupler 32, a lower die plate 33, a lower cavity 34, and a lower die 35. In the lower cavity 34, opposite the concave section 31, there is formed a concavely curved concave section 36 which matches the shape of the optical surface 19. When the upper mold 25 is coupled with the lower mold 26, the concave sections 31 and 36 and an inner wall of the lower die 35 form a space 37 having a shape of the objective lens 3.

When the pressing machine 24 is used for fabricating the objective lens 3, the upper mold 25 is first lifted as shown in FIG. 11A. A ball-shaped glass preform material 38 is supplied in the concave section 36 and is heated until the material reaches a specified temperature. As shown in FIG. 11B, the upper mold 25 is lowered to press the preform material 38 into the shape of the objective lens 3. Thereafter, as shown in FIG. 11C, the formed objective lens 3 is cooled. The upper mold 25 is lifted for allowing the objective lens 3 to be removed from the concave section 36.

As mentioned above, when the objective lens 3 is fabricated, the preform material 38 is placed in the concave section 36. At this time, the preform material 38 rolls on the concave section 36 for centering between the preform material 38 and the concave section 36. However, since the optical surface 19, namely the concave section 36, provides a large curvature radius, the preform material 38 does not efficiently roll on the concave section 36. The preform material 38 may be formed with incomplete centering between the preform material 38 and the concave section 36. In this case, as shown in FIG. 13, the preform material 38 flows into a gap formed among the cavities 29 and 34 and the dies 30 and 35, causing an over-packing phenomenon 39 to damage the cavities 29 and 34 and the dies 30 and 35. Alternatively, the preform material 38 is not filled completely in the space 37, causing an non-uniform section 40. There has been a possibility of generating asymmetrical components of aberration such as a spherical aberration, coma aberration, etc.

SUMMARY OF THE INVENTION

The present invention has been made in consideration of the foregoing. It is therefore an object of the present invention to provide an objective lens capable of achieving reliable centering during formation, allowing high-precision formation, and improving durability of a manufacturing apparatus, and to provide an optical pickup apparatus and an optical disk apparatus using that objective lens.

The present invention is characterized in that condition $0.3 \leq Z/D \leq 0.5$ is satisfied, where Z is a sag amount equivalent to a length of a convexly curved optical surface along the optical axis, and D is an optically effective diameter equivalent to a length which is optically effective for the optical surface and is orthogonal to the optical axis.

The optical surface is a spherical. A surface opposite the convexly curved optical surface is concavely curved.

An optical pickup apparatus according to the present invention comprises a light source for generating light beams, an objective lens for focusing light beams generated from the light source onto an optical disk, and an optical detector for receiving a return light beam from the optical disk. The optical pickup apparatus is characterized in that the objective lens is formed so as to satisfy condition $0.3 \leq Z/D \leq 0.5$, where Z is a sag amount equivalent to a length of a convexly curved optical surface along the optical axis, and D is an optically effective diameter equivalent to a length which is optically effective for the optical surface and is orthogonal to the optical axis.

Further, an optical pickup apparatus according to the present invention comprises an optical disk drive apparatus for rotating an optical disk, and an optical pickup apparatus for focusing light beams irradiated from a light source onto an optical disk via an objective lens controlled and driven at least in a focusing direction and receiving return light from the optical disk. The optical pickup apparatus is characterized in that the objective lens is formed so as to satisfy condition $0.3 \leq Z/D \leq 0.5$, where Z is a sag amount equivalent to a length of a convexly curved optical surface along the optical axis, and D is an optically effective diameter equivalent to a length which is optically effective for the optical surface and is orthogonal to the optical axis.

This configuration makes it possible to provide a small curvature radius for the optical surface, reliably perform centering during optical lens fabrication, and allow high-precision formation for decreasing the lens aberration.

In more detail, it is possible to improve the accuracy of centering the preform material by using a deep mold having a small curvature radius, allowing high-precision lens formation. The convexly curved optical surface can have a small effective diameter, eliminating the need for applying a large pressure during formation and decreasing a filling ratio of the preform material. Hence, a uniform pressure is easily applied between the center and an external periphery, decreasing an internal stress difference caused between the center and an external location of the preform material when it is pressed. This prevents a completed shape from being deformed due to an internal pressure difference during a cooling process after pressing. Accordingly, it is possible to reliably form the lens into a desired shape and decrease the lens aberration.

Since the filling ratio can be decreased, an excess pressure is not applied to a manufacturing apparatus when an optical lens is formed. This can improve durability of the manufacturing apparatus and provide various advantageous effects.

DETAILED DESCRIPTION OF THE INVENTION

Figure 1:
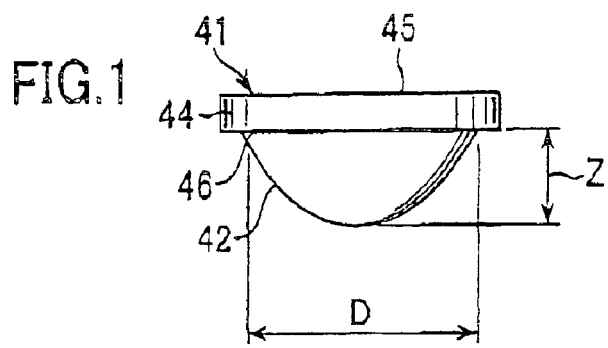
FIG. 1 is a side view showing an objective lens according to an embodiment of the present invention.

Embodiments of the present invention will be described with reference to the accompanying drawings. The mutually corresponding parts in FIGS. 1 to 6 are designated by the same reference numerals in FIGS. 9 to 13 and a detailed description about configurations and effects is omitted for simplicity.

FIG. 1 shows an objective lens 41 according to an embodiment of the present invention. For example, the objective lens 41 is made of glass and comprises a convexly curved optical surface 42 and a flange-shaped rim section 44 formed at the edge side of the optical surface 42. Another optical surface 45 is formed to the side of the opposite optical surface of the rim section 44. For example, another optical surface 45 is concavely curved and has a negative refractivity. The objective lens 41 constitutes a meniscus lens. The optical surface 42 shows a ratio of sag amount Z to optically effective diameter D. Namely, the Z/D value is 0.3 or more. Accordingly, the optical surface 42 has a small curvature radius and provides a large refractivity. By changing the refractivity of another optical surface 45, it is possible to change the number of apertures for the objective lens 41 in a wide range. The optical surface 42 and another optical surface 45 are aspherical.

Figure 2:
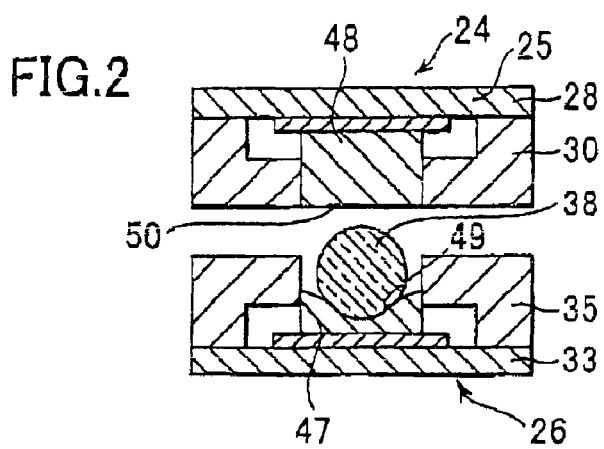
FIG. 2 is a sectional view showing a method of fabricating an objective lens according to an embodiment of the present invention.
Figure 3:
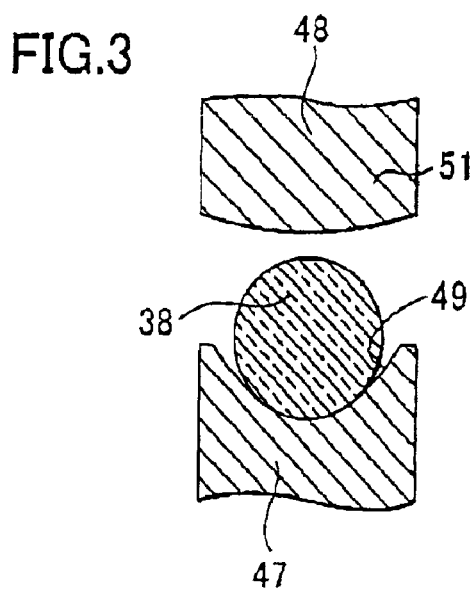
FIG. 3 is a sectional view showing a method of fabricating an objective lens according to an embodiment of the present invention.
Figure 4A:
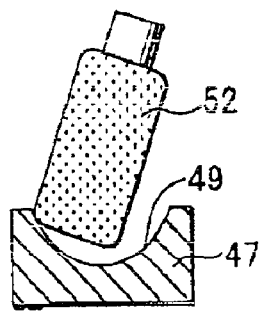
FIG. 4A is a schematic diagram showing a method of forming a cavity concave section according to an embodiment of the present invention.
Figure 4B:
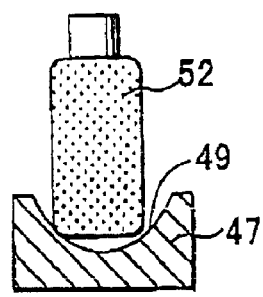
FIG. 4B is a schematic diagram showing a method of forming a concave section according to an embodiment of the present invention.
Figure 4C:
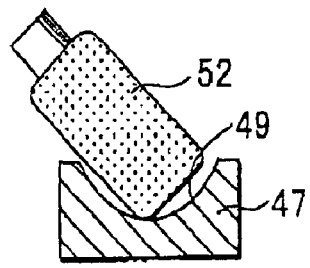
FIG. 4C is a schematic diagram showing a method of forming a concave section according to an embodiment of the present invention.
Figure 5A:
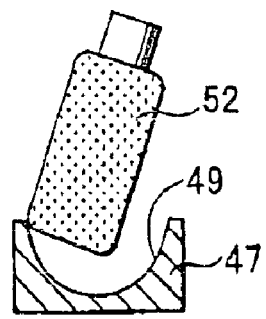
FIG. 5A is a schematic diagram showing a method of forming a concave section when Z/D exceeds 0.5.
Figure 5B:
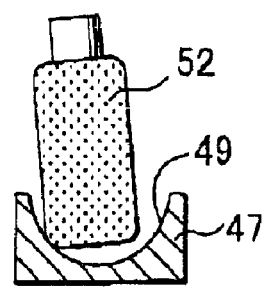
FIG. 5B is a schematic diagram showing a method of forming a concave section when Z/D exceeds 0.5.
Figure 5C:
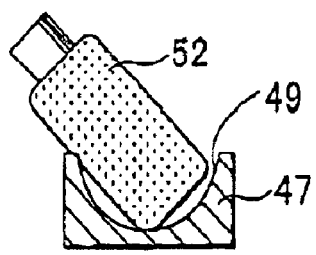
FIG. 5C is a schematic diagram showing a method of forming a concave section when Z/D exceeds 0.5.

The pressing machine 24 for fabricating the objective lens 41 has a structure similar to he prior art and a detailed description thereof is omitted. As shown in FIGS. 2 and 3, this embodiment uses a lower cavity 47 and an upper cavity 48 whose shapes differ from the prior art. The lower cavity 47 is provided with a deep concave section 49 having a small curvature radius so as to match the shape of the optical surface 42. The upper cavity 48 is provided with a shallow concave section 50 (see FIG. 2) having a larger curvature radius than the prior art or a convex section 51 (see FIG. 3) so as to match the shape of another optical surface 45. In this case, it is a general practice to form a concavely curved surface on the concave section 49 by grinding ceramics of silicon carbide etc. or a sintered hard alloy using a grinding stone 52. When an attempt is made to form a concavely curved surface having a smaller curvature radius than the hemispherical surface, the cavity 47 interferes with the grinding stone 52 as shown in FIG. 5C. It is impossible to form a curved surface with a smaller curvature radius than the hemispherical surface on the optical surface 42. Accordingly, for a processing reason, the ratio of sag amount Z to optically effective diameter D (Z/D) does not exceed 0.5 on the optical surface 42.

Figure 6:
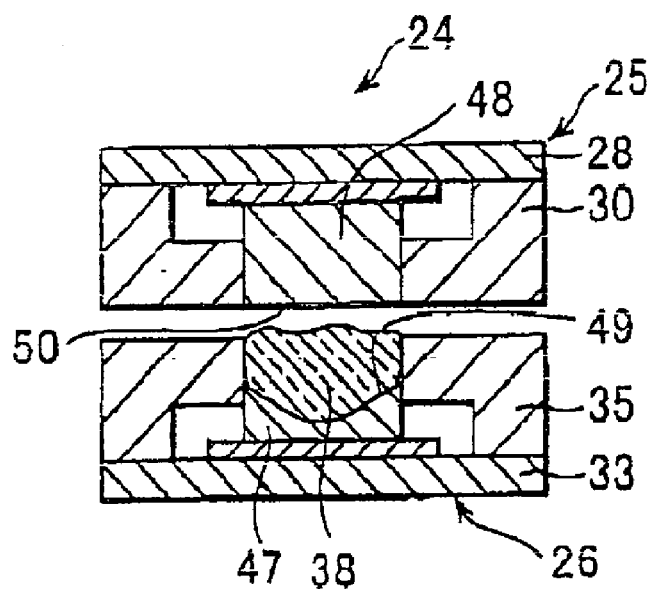
FIG. 6 is a sectional view showing a method of fabricating an objective lens according to an embodiment of the present invention.

The pressing machine 24 is used for forming the objective lens 41 in the same procedure as the prior art. The concave section 49 of the lower cavity 47 is deep and has a small curvature radius. Consequently, when the ball-shaped preform material 38 is supplied to the concave section 49, the center of the preform material 38 precisely matches that of the concave section 49 as shown in FIGS. 2 and 3. When the preform material 38 is pressed, it is possible to prevent an over-packing phenomenon which causes damage to the cavities 29 and 34, causes an ununiformed section, and generates asymmetrical components of aberration such as aspherical aberration, coma aberration, etc. As shown in FIG. 6, it is desirable to use the preform material 38 having a shape similar to the objective lens 41, especially having a curvature radius similar to that of the optical surface 42. In this case, a lens can be easily formed with a uniform pressure, further improving the lens shape accuracy and moreover decreasing damage to the cavities 47 and 48, etc. The above-mentioned procedure was used to form a meniscus lens with Z of 1.53 mm, D of 3.8 mm, and Z/D of approximately 0.4, resulting in a good aberration.

While the above-mentioned embodiment has described the objective lens 41 used for an optical pickup apparatus and an optical disk apparatus, it is to be distinctly understood that the present invention is not limited thereto but may be applicable to other objective lenses used for other devices, etc.

Figure 7:
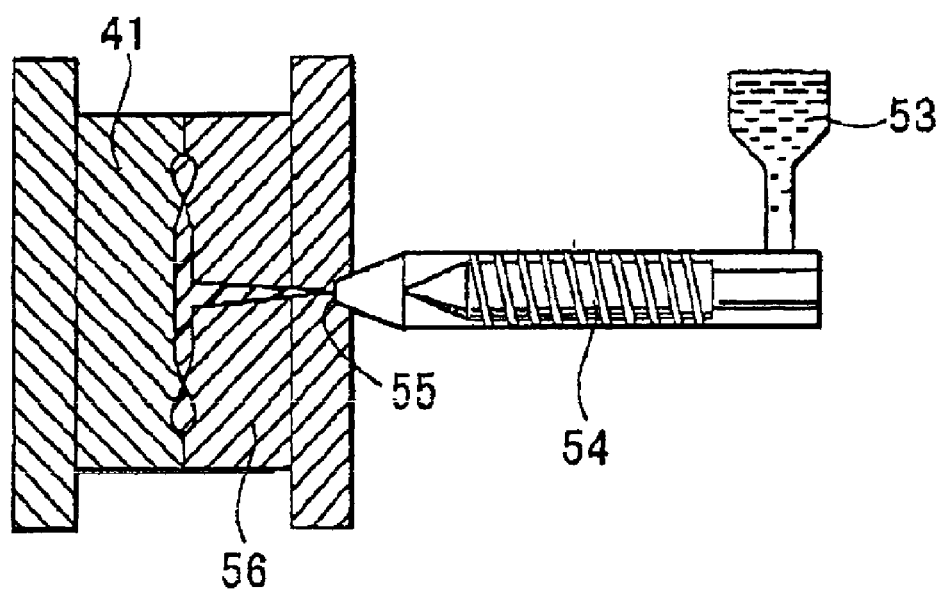
FIG. 7 is a sectional view showing another method of fabricating an objective lens according to an embodiment of the present invention.
Figure 8:
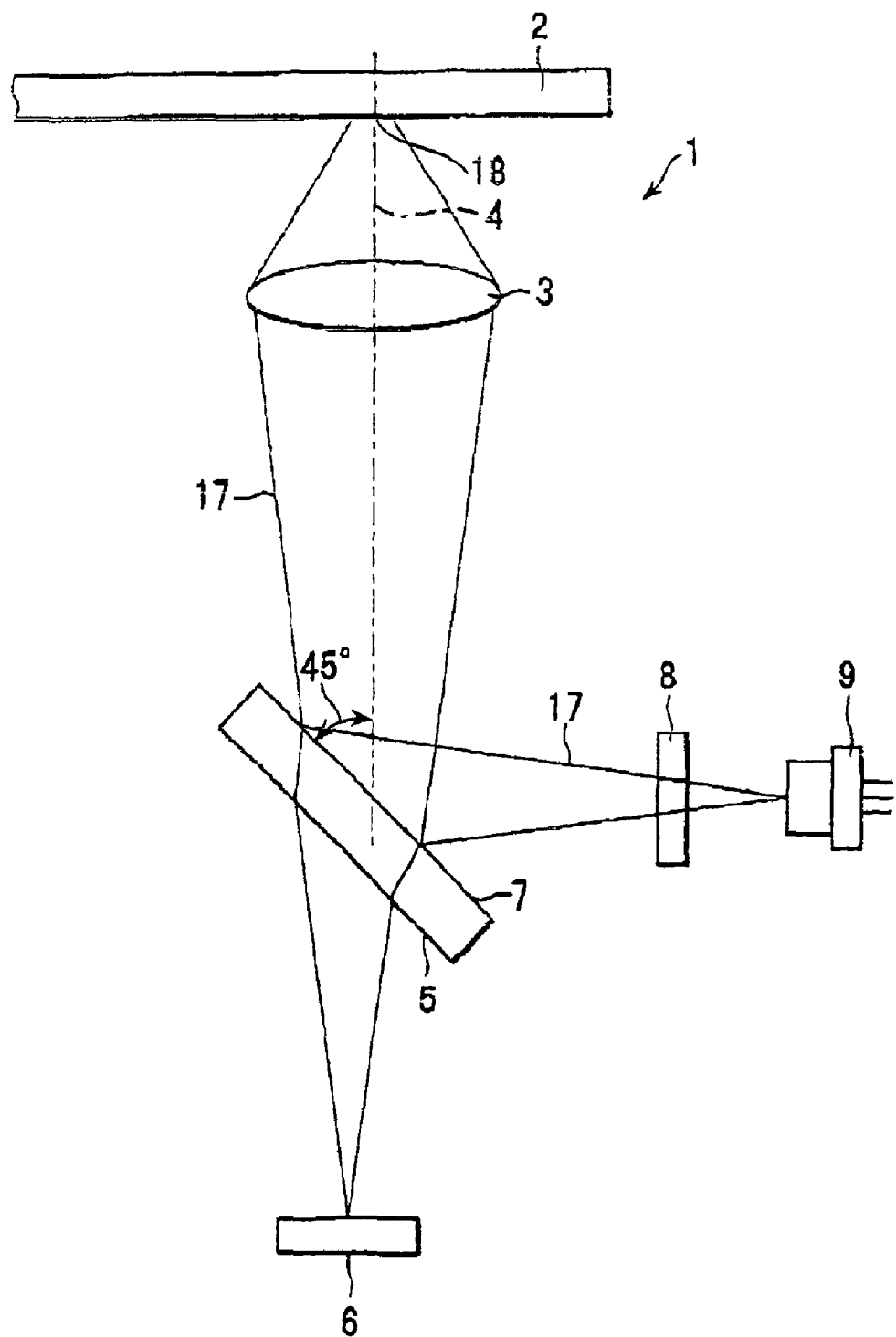
FIG. 8 is a schematic configuration diagram showing an optical pickup apparatus.
Figure 9:
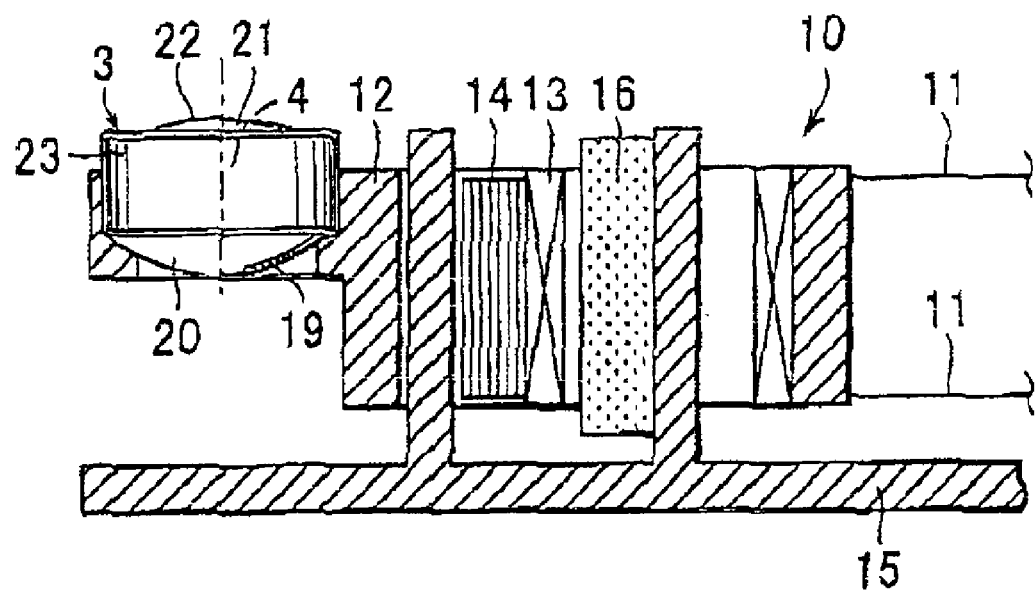
FIG. 9 is a sectional view showing an objective lens drive section of the prior art.
Figure 10:
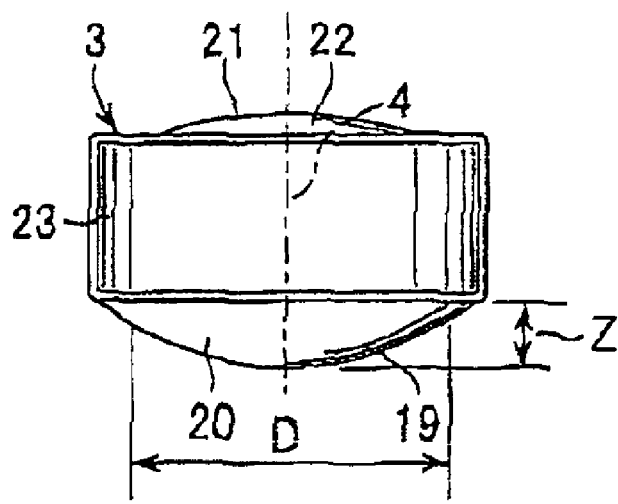
FIG. 10 is a side view showing an objective lens of the prior art.
Figure 11A:
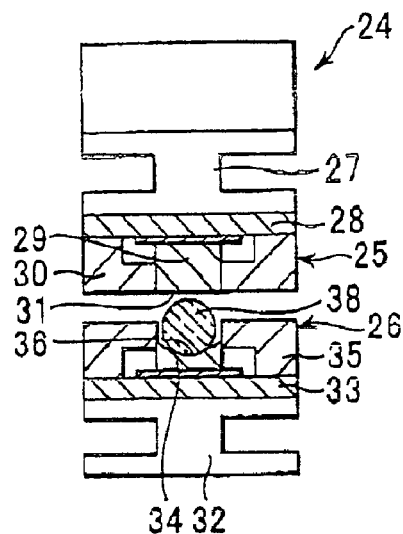
FIG. 11A is a sectional view showing a method of fabricating a conventional objective lens.
Figure 11B:
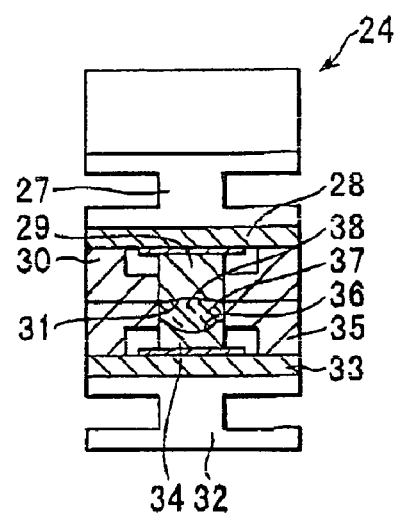
FIG. 11B is a sectional view showing a method of fabricating a conventional objective lens.
Figure 11C:
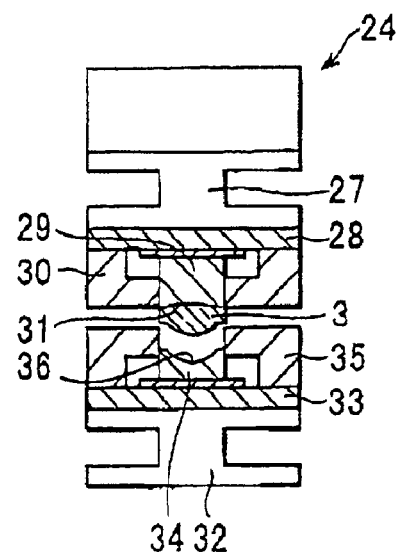
FIG. 11C is a sectional view showing a method of fabricating a conventional objective lens.
Figure 12:
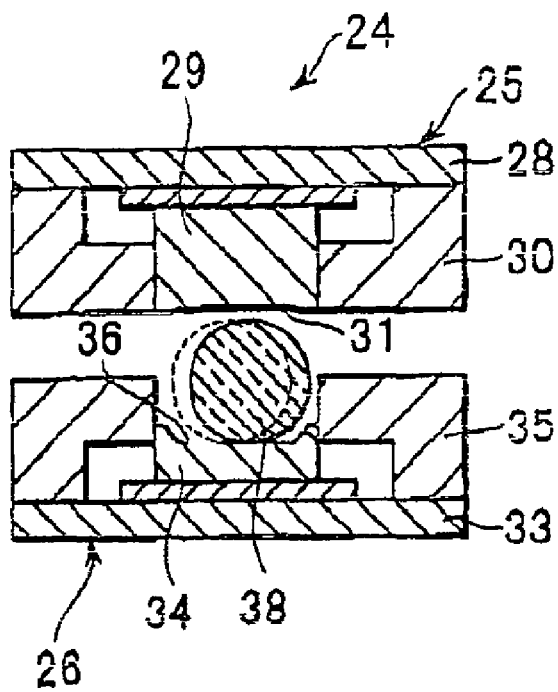
FIG. 12 is a sectional view showing a method of fabricating a conventional objective lens.
Figure 13:
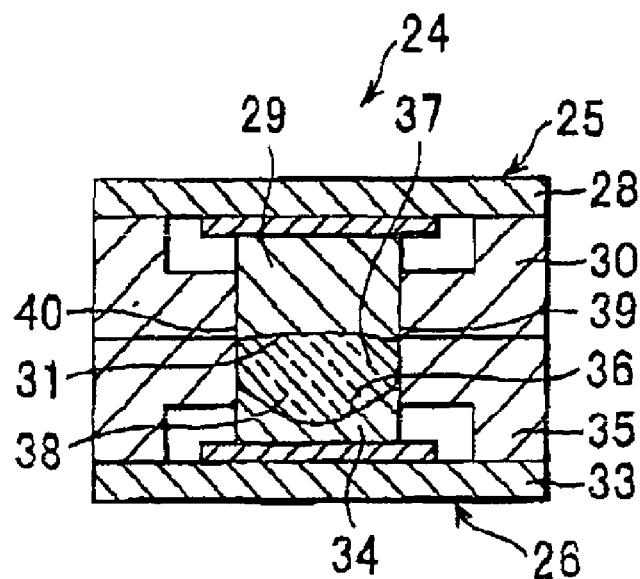
FIG. 13 is a sectional view showing a method of fabricating a conventional objective lens.

The optical surfaces 42 and 45 in the above-mentioned embodiment are aspherical, but may be spherical. The concavely curved surface of the concave section may be coated with a glass mold release film. The material of the objective lens 41 is not limited to glass. It may be preferable to use plastic or a replica lens compounded from plastic and glass by polishing or mold-finishing and combining, or insert-molding two or more types of materials. When the objective lens 41 is plastic, it may be preferable to use injection molding to form a lens. In this case, as shown in FIG. 7, plastic pellets are supplied to a hopper 53 and are heated and melted in a screw 54. The melted plastic is injected into a mold 56 from a tip nozzle 55.

What is claimed is:

1. An optical lens, wherein said lens is formed so as to satisfy condition $0.3 \leq Z/D \leq 0.5$, where Z is a sag amount equivalent to a length of a convexly curved optical surface of said optical lens along an optical axis, and D is an optically effective diameter equivalent to a length which is optically effective for said optical surface and is orthogonal to the optical axis.

2. The optical lens according to claim 1, wherein said optical surface is aspherical.

3. The optical lens according to claim 1, further comprising a concavely curved surface formed opposite to said convexly curved optical surface of said optical lens.

4. An optical pickup apparatus comprising:

a light source for irradiating a light beam;

an objective lens for focusing a light beam irradiated from said light source onto an optical disk; and an optical detector for receiving a return light beam from said optical disk, wherein said objective lens is formed so as to satisfy condition $0.3 \leq Z/D \leq 0.5$, where Z is a sag amount equivalent to a length of a convexly curved optical surface of said objective lens on the light source side along an optical axis, and D is an optically effective diameter equivalent to a length which is optically effective for said optical surface and is orthogonal to the optical axis.

5. An optical disk apparatus comprising:

an optical disk drive apparatus for rotating an optical disk; and an optical pickup apparatus for focusing light beams irradiated from a light source onto an optical disk via an objective lens controlled and driven at least in a focusing direction and receiving return light from the optical disk, wherein said objective lens is formed so as to satisfy condition $0.3 \leq Z/D \leq 0.5$, where Z is a sag amount equivalent to a length of a convexly curved optical surface of said objective lens on the light source side along an optical axis, and D is an optically effective diameter equivalent to a length which is optically effective for said optical surface and is orthogonal to the optical axis.

* * * * *